A. H. FETZER.
STEERING GEAR.
APPLICATION FILED JAN. 21, 1910.
1,060,175.
Patented Apr. 29, 1913.
2 SHEETS—SHEET 2.
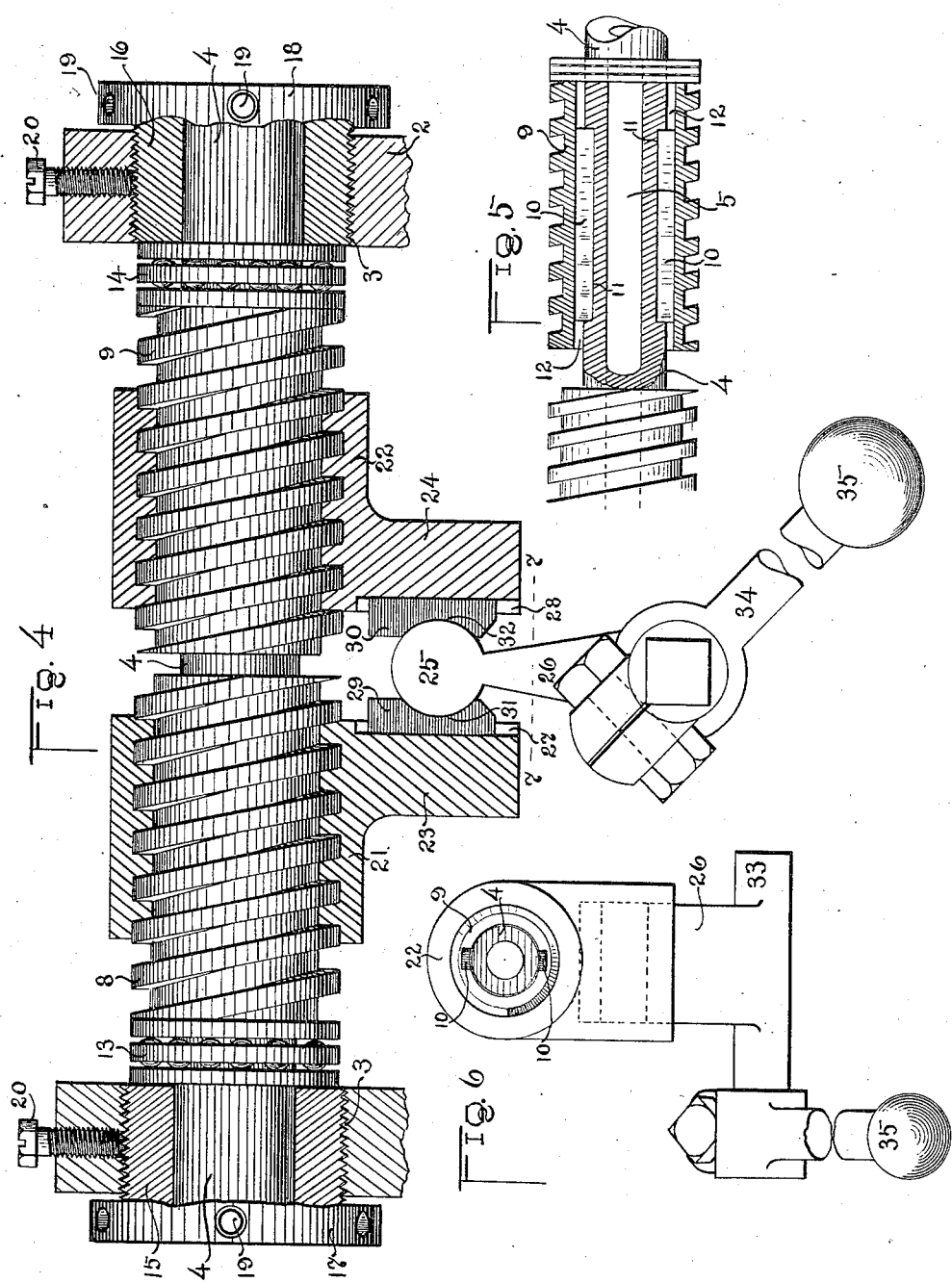

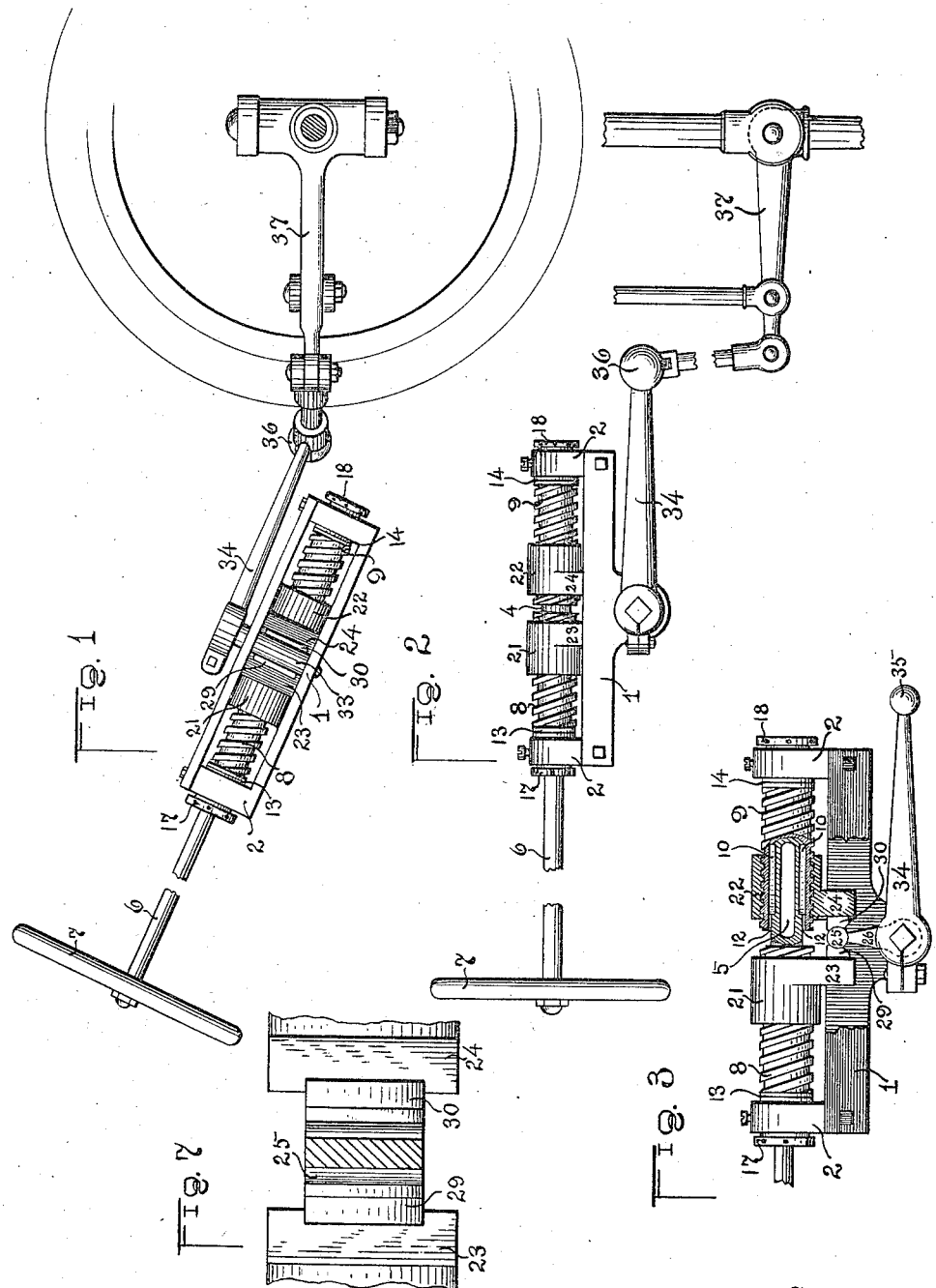

UNITED STATES PATENT OFFICE.

ALLEN H. FETZER, OF GALION, OHIO.

STEERING-GEAR.

1,060,175. Specification of Letters Patent. Patented Apr. 29, 1913.

Application filed January 21, 1910. Serial No. 539,325.

*To all whom it may concern:*

Be it known that I, ALLEN H. FETZER, a citizen of the United States, residing at Galion, in the county of Crawford and State of Ohio, have invented certain new and useful Improvements in Steering-Gears; and I do hereby declare the following to be a full, clear, and exact description of the invention, such as will enable others skilled in the art to which it appertains to make and use the same.

My invention relates to new and useful improvements in steering gears for automobiles or similarly propelled vehicles and my object is to provide a worm and construct the same in two sections, whereby said sections may be adjusted to compensate for wear.

A further object is to provide a swinging arm which is adapted to operate the steering mechanism.

A further object is to provide means to coöperate with said worm and move longitudinally thereof, and, a further object is to provide means for attaching said swinging arm to the movable parts on the worm gear.

Other objects and advantages will be hereinafter referred to and more particularly pointed out in the specification and claim.

In the accompanying drawings which are made a part of this application, Figure 1 is an elevation of the worm as applied to use. Fig. 2 is a plan view thereof. Fig. 3 is a detail view partly in section of the worm and parts attached thereto. Fig. 4 is an enlarged sectional view of the worm. Fig. 5 is a detail view partly in section of the worm employed in connection with the steering mechanism. Fig. 6 is an end elevation of the worm removed from its supporting frame, and, Fig. 7 is a detail view as seen on line 7—7 Fig. 4.

Referring to the drawings in which similar reference numerals designate corresponding parts throughout the several views, 1 indicates a frame which may be constructed in any preferred manner, the end sections 2 of which are provided with threaded openings 3 for a purpose to be hereinafter set forth. Extending through the openings 3 is a shaft 4, which shaft is provided with a socket 5 which extends longitudinally through the shaft and into said socket 5 is adapted to be secured the usual form of steering shaft 6, a wheel 7 being attached to the upper end of said shaft 6, whereby the shaft may be readily rotated.

Substantially one half of that portion of the shaft 4 extending between the ends 2 has fixed thereon or formed integral therewith a worm section 8, while the remaining portion of the shaft between the ends 2 is surrounded by a similar worm section 9, said worm section 9 being slidably mounted upon the shaft 4 and caused to rotate therewith by means of keys 10, said keys being seated in grooves 11 in the shaft 4, the protruding portions thereof entering ways 12 extending longitudinally of the worm section 9.

Engaging the outer ends of the worm sections 8 and 9 are ball bearings 13 and 14 respectively and in order to properly adjust the worm sections and also compensate for any wear thereon, adjusting nuts 15 and 16 are entered through the threaded openings 3 in the ends 2 and are adapted to abut against the ball bearings at their inner ends, while the outer ends of the nuts are provided with heads 17 and 18 in which are provided openings 19 to receive a spanner wrench or the like when said nuts are to be rotated.

When the nuts have been turned to their proper position, they are securely locked by means of set screws or the like 20, which are entered in threaded openings in the ends 2 and bind on the threaded exterior of the nuts so that when said nuts are once properly adjusted, they are held in said adjusted position until such time as it is again desired to adjust the worms. Adapted to coöperate with the worm sections 8 and 9 are sleeves 21 and 22 respectively, each sleeve being interiorly threaded, whereby when the worm is rotated, the sleeves will move in unison from end to end of said worm sections.

The sleeves are provided respectively with laterally extending arms 23 and 24, which arms are positioned at the meeting ends of said sleeves and receive the knuckle end 25 of a lever 26, the meeting faces of the arms having ways 27 and 28 therein to receive blocks 29 and 30 respectively, said blocks having curved recesses 31 and 32 to form a seat for the knuckle 25, which knuckle is substantially circular in cross section and by providing the ways 27 and 28 of a greater depth than the depth of the blocks, said blocks will slide back and forth in the ways when the lever 26 swings on its pivot. The stem portion 33 of the lever 26 is pivoted in any suitable form of bearings (not shown) and has secured to its upper end a crank or pitman 34, the outer end of said crank having a ball 35 thereon, which ball is received in a socket 36 carried by the usual or any preferred form of steering mechanism 37 and it will be readily seen that as the sleeves are moved back and forth over the worm sections, the crank 34 will be swung in the arc of a circle and the steering mechanism thus operated.

In assembling the parts of the gear together, the sleeves 21 and 22 are positioned adjacent the inner ends of the worm sections and the knuckle end 25 of the lever 26 positioned between the arms 23 and 24, when the adjusting nut 16 is moved inwardly and the worm section 9 moved toward the stationary section 8, which will result in forming a perfect union between the bearing blocks 29 and 30 and the knuckle 25 and it will be readily seen that as the sleeves travel in unison, the adjustment of the movable worm section through the medium of the adjusting nut will retain the arms of the sleeves in engagement with the knuckle until such time as the adjusting nut is again released. It will further be seen that as the bearing parts of the gearing become worn, such wear may be readily compensated for through the medium of the adjusting nuts 15 and 16, thus maintaining a close union between the several parts at all times. It will further be seen that by providing a device of this class, the course of the wheels cannot be changed by coming in contact with objects in the path of the wheels as the threads on the worm are so arranged as to form a perfect lock between the worm sections and the sleeves, in which event the sleeves cannot be moved on the worm sections, except through the medium of the steering shaft 6. In this connection, applicant further desires to state that the movement of the vehicle will always be under the control of the operator at whatever degree of angle the wheels may be turned. It will further be seen that in view of the simplicity of the herein described steering gear, the parts thereof may be very cheaply constructed and readily assembled together and it will likewise be seen that although the parts are comparatively light, the manner of constructing the same will render them strong and durable and that any parts thereof may be readily renewed should they become broken or worn out.

What I claim is:

In a steering gear, a frame having parallel side pieces, laterally projecting ends secured between the opposite ends of said side pieces, a shaft positioned through said ends having threaded sections thereon, sleeves threaded on said sections, and having arms slidably received between said side pieces, said arms having radial guide ways in their opposing faces, a block slidably mounted in each of said ways having cup bearings in their opposing faces and having the outer opposing corners beveled, a shaft mounted through said side pieces having an arm, said arm being positioned in said side pieces and having a knuckle at its end adapted to be seated between said cup bearing blocks, whereby when the sleeves are moved longitudinally in unison, on the threaded sections, the crank shaft will be oscillated and the blocks moved radially of the worms to prevent binding of the knuckle.

In testimony whereof I have signed my name to this specification in the presence of two subscribing witnesses.

ALLEN H. FETZER.

Witnesses:
C. H. HENKEL,
BERTHA GREBE.

---

Copies of this patent may be obtained for five cents each, by addressing the "Commissioner of Patents, Washington, D. C."